（12）United States Patent
Fries

(10) Patent No.: US 12,178,323 B2
(45) Date of Patent: Dec. 31, 2024

(54) RETAINING CLIP FOR SECURING A WALL ELEMENT OF AN ITEM OF FURNITURE TO A FURNITURE STRUCTURE AND ITEM OF FURNITURE HAVING AT LEAST ONE RETAINING CLIP

(71) Applicant: Steelcase Inc., Grand Rapids, MI (US)

(72) Inventor: Florian Fries, Munich (DE)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 17/759,662

(22) PCT Filed: Feb. 14, 2020

(86) PCT No.: PCT/IB2020/000037
§ 371 (c)(1),
(2) Date: Jul. 28, 2022

(87) PCT Pub. No.: WO2021/161055
PCT Pub. Date: Aug. 19, 2021

(65) Prior Publication Data
US 2023/0061065 A1    Mar. 2, 2023

(51) Int. Cl.
*A47B 96/06* (2006.01)
(52) U.S. Cl.
CPC .................................... *A47B 96/06* (2013.01)
(58) Field of Classification Search
CPC ... A47B 96/066; A47B 96/068; A47B 96/024; A47B 96/06; A47B 96/07; A47B 96/04; A47B 96/063; A47B 47/03; A47B 47/05; A47B 47/0025; A47B 47/0075

USPC ............. 312/265.5, 265.6, 140, 265.1–265.4
See application file for complete search history.

(56) References Cited

U.S. PATENT DOCUMENTS

| 788,979 | A | * | 5/1905 | Williams | ................ | A47F 5/005 |
| | | | | | | 312/140 |
| 4,101,233 | A | * | 7/1978 | McConnell | .......... | A47B 96/024 |
| | | | | | | 211/187 |
| 4,206,956 | A | * | 6/1980 | Lydmar | .................. | A47B 47/03 |
| | | | | | | 312/111 |

(Continued)

FOREIGN PATENT DOCUMENTS

| DE | 2163583 A1 | 7/1973 |
| JP | H0550123 U | 7/1993 |

(Continued)

OTHER PUBLICATIONS

European Patent Office; International Search Report; Aug. 10, 2020; entire document.

*Primary Examiner* — Jonathan Liu
*Assistant Examiner* — Guang H Guan
(74) *Attorney, Agent, or Firm* — Price Heneveld LLP

(57) ABSTRACT

The invention relates to a retaining clip for securing a wall element of an item of furniture to a furniture structure, the retaining clip including a securing section and a stop section which is configured to abut a first structural element of the furniture structure. The retaining clip further includes a clip section which is configured to be resiliently moved between an insertion position permitting the insertion of the wall element into the furniture structure and a retaining position engaging behind a second structural element of the furniture structure.

17 Claims, 6 Drawing Sheets

(56) References Cited

U.S. PATENT DOCUMENTS

| | | | | |
|---|---|---|---|---|
| 4,650,263 | A | * | 3/1987 | Monaghan ............... F16B 12/24 |
| | | | | 108/154 |
| 5,165,770 | A | * | 11/1992 | Hahn ..................... H02B 1/565 |
| | | | | 312/265.6 |
| 5,176,435 | A | * | 1/1993 | Pipkens ................. A47B 17/00 |
| | | | | 312/265.6 |
| 5,486,041 | A | * | 1/1996 | Sykes ..................... F16B 12/46 |
| | | | | 312/263 |
| 6,557,956 | B2 | * | 5/2003 | Hightower ............. A47B 47/05 |
| | | | | 24/297 |
| 7,770,985 | B2 | * | 8/2010 | Davis ...................... F25D 23/02 |
| | | | | 312/328 |
| 2016/0377223 | A1 | * | 12/2016 | Heffel .................... F24C 15/16 |
| | | | | 248/215 |
| 2023/0061065 | A1 | * | 3/2023 | Fries .................... A47B 96/066 |

FOREIGN PATENT DOCUMENTS

| | | | | |
|---|---|---|---|---|
| JP | 2014077484 | A | | 5/2014 |
| JP | 2015194170 | A | | 11/2015 |
| KR | 102493642 | B1 | * | 2/2023 ........... A47B 96/066 |
| TR | 201808913 | A2 | | 2/2020 |

* cited by examiner

RETAINING CLIP FOR SECURING A WALL ELEMENT OF AN ITEM OF FURNITURE TO A FURNITURE STRUCTURE AND ITEM OF FURNITURE HAVING AT LEAST ONE RETAINING CLIP

BACKGROUND OF THE INVENTION

The invention relates to a retaining clip for securing a wall element of an item of furniture to a furniture structure and to an item of furniture having at least one retaining clip.

Items of furniture in the form of shelf units or cupboards or other box-shaped pieces of furniture often have a frame structure to which one or more wall elements, for example side walls or a back wall, are to be secured.

Such wall elements are usually secured to the frame structure by means of screws. However, this is relatively time-consuming and cumbersome and, in particular, not possible without tools.

In addition, it is known to use tubular structural or frame elements which have a circular cross section for the frame structure of items of furniture. The wall elements are made of metal and have groove-like mouldings in their edge regions for locking with the frame tubes in this case. The disadvantage here is that the entire edge regions of the wall elements must be specially shaped and their shape must be adapted to the frame tubes. In addition, this securing system is only usable with wall elements made of very specific materials, especially sheet steel.

The invention is therefore based on the object of creating a retaining clip for securing a wall element to a furniture structure, with which clip the securing of wall elements to a furniture structure is possible in a particularly simple and quick manner and without tools. Furthermore, an item of furniture having such a retaining clip is to be created.

SUMMARY OF THE INVENTION

The retaining clip according to the invention comprises a securing section for securing the retaining clip to the wall element, the securing section having a first edge section and a second edge section a stop section which extends away from the first edge section of the securing section in a first direction and is designed to abut a first structural element of the furniture structure, and a resilient clip section which extends away from the second edge section of the securing section in a second direction different from the first direction and is resiliently movable between an insertion position permitting the insertion of the wall element into the furniture structure and a retaining position engaging behind a second structural element of the furniture structure.

Within the scope of the invention, "furniture structure" is understood to mean the structure of an item of furniture which is present before the wall element is attached. Such a furniture structure comprises in particular a frame structure, the first structural element being a frame part, and a second structural element in the form of a board, for example a shelf board (base board/shelf/cover board) or a cross strut of the frame structure. Within the scope of the present invention, "item of furniture" is understood to mean the entirety of furniture structure and wall element.

Using the retaining clip according to the invention, the wall element can be inserted and clipped into the furniture structure easily and quickly and without tools from one side, in particular from the inside of the item of furniture, the wall element advantageously centring itself in the furniture structure. The retaining clip can be made from different materials and preferably consists of a plastic or metal. The retaining clip can be used to secure a wide variety of wall elements, for example wall elements made of wood, plastic or metal. Because the retaining clips are secured to the wall element only after said element has been manufactured, the wall elements can also be manufactured in a simple and cost-effective manner. Advantageously, apart from the retaining clips, no further securing means are required in order to secure and centre the wall element on the furniture structure.

Preferably, the securing section of the retaining clip is planar, the first and second edge sections thereof extending at an angle of 90° to each other, and the stop section and the clip section protruding beyond the edge sections in directions orthogonal to each other. Such a retaining clip is particularly suitable for rectangular wall elements. If the retaining clip is to be used with wall elements that do not have rectangular corners, the stop section and the clip section can also assume other angles appropriately adapted with respect to one another. The planar design of the securing section ensures that the retaining clip rests against the wall element over a relatively large area, so that the wall elements are reliably prevented from breaking away in the securing region, even under greater loads.

The securing section preferably has the shape of a triangle, in particular a right triangle. Such a shape offers manufacturing advantages. Furthermore, in this way the retaining clips can be secured in a simple and visually appealing manner in the region of the corners of the wall element. In this case, the retaining clips are preferably inserted into a securing slot which is introduced from the end faces of the wall element in the region of its corners, for example by sawing or milling. The hypotenuse of the triangular securing section is preferably straight, but may be curved or otherwise shaped. Furthermore, it is possible to design the shape of the securing section differently, in particular in a rectangular shape.

The securing section preferably has, on at least one of its lateral surfaces, projecting anchoring knobs which are designed to anchor the retaining clip in the wall element. Such anchoring knobs allow the retaining clip to be fixed in a securing slot of the wall element in a simple manner without additional securing means. However, depending on the material of the wall element, it is also possible, alternatively or additionally, to secure the retaining clip in the securing slot of the wall element by means of an adhesive, in particular hot-melt adhesive.

If the retaining clip and the wall element consist of a weldable material, in particular plastics material, it is also possible to weld the retaining clip to the wall element, in particular by means of an ultrasonic welding process.

According to an advantageous embodiment, the securing section has a main plane, the stop section having a stop surface designed to abut the first structural element of the furniture structure, which stop surface is arranged at an angle of 45° to the main plane of the securing section. In this way, the stop surface of the stop section is arranged in such a way that it can abut, over its entire surface, a first structural element, in particular a vertical support element or upright tube of the furniture structure, which is arranged rotated 45° relative to a body of the item of furniture. However, the stop surface of the stop section can also be aligned and/or configured differently; for example, it can be round. The stop surface is expediently designed and arranged such that when retaining clips are secured on opposite sides of the wall element, the wall element self-centres, or at least is supported, in the furniture structure in a specific direction, e.g., horizontally.

The stop section and clip section are preferably spaced apart 2 to 50 mm, preferably by 4 to 30 mm, particularly preferably by 6 to 20 mm from a corner of the securing section formed by the edge sections. This distance means that the forces transmitted to the wall element via the stop section and clip section are introduced into the wall element at a corresponding distance from the corner of the wall element, so that the risk of the corner of the wall element breaking away under greater loads is reliably prevented. The position and size of the stop section and clip section are appropriately matched to the respective application.

Preferably, the clip section is L-shaped in cross section and includes a connecting leg that is integrally formed on the securing section and extends transversely therefrom, and a retaining leg integrally formed on the connecting leg and designed to rest against the second structural element of the shelving structure.

It is particularly preferred here if the connecting leg extends at an angle of greater than 90° and up to 160°, preferably of 90° to 120°, particularly preferably of 108° to 112°, to the securing section. As a result, the connecting leg of the retaining clip inserted into the securing slot of the wall element moves away from the end face of the wall element in the direction of its free end, thereby creating a free space that is used to compress the retaining clip when the wall element is inserted into the furniture structure together with the retaining clip. Furthermore, the obliquely arranged connecting leg applies a prestressing force between the wall element and the furniture structure in one direction, for example in the vertical direction, and ensures the self-centring of the wall element in the furniture structure in this direction.

The stop section and the clip section preferably form insertion stops for limiting the insertion path of the securing section into the wall element. This ensures the correct positioning of the retaining clip in a securing slot of the wall element in a simple manner.

The object set according to the invention is also achieved by an item of furniture having at least one retaining clip, as described above.

The wall element is preferably planar and comprises lateral surfaces, first and second end faces forming a corner, and a securing slot for inserting the securing section of the retaining clip, the securing slot extending into the wall element from the corner of the wall element between the lateral surfaces.

With the help of such a securing slot, the retaining clip can be secured to the wall element in a simple, quick and secure manner. In this case, the securing section is preferably completely accommodated within the wall element and, after the wall element has been mounted on the item of furniture, is not visible either from the inside or from the outside of the item of furniture.

Preferably, the first and second edge sections of the securing section of the retaining clip inserted into the securing slot extend parallel to the first and second end faces of the wall element.

Furthermore, it is advantageous if the stop section of the inserted retaining clip is located in the gap between two planes in which the lateral surfaces of the wall element lie. In this case, the stop section does not protrude beyond the lateral surfaces of the wall element, which is particularly advantageous from a visual point of view.

Preferably, the first structural element with which the stop section of the retaining clip interacts is a vertical support element of the furniture, while the second structural element with which the clip section of the retaining clip interacts is a board, a horizontal strut of the item of furniture. In the context of the present invention, the term "board" is to be understood in the most general manner and can include any planar elements, regardless of their material.

The first structural element is particularly preferably a vertical support element of a shelf unit and the second structural element is a shelf board or a horizontal cross strut of a shelf unit.

Preferably, the furniture has at least two vertical support elements with a rectangular cross section and at least one board with a rectangular contour, which board is supported by the support elements, the rectangular cross section of the support elements being arranged rotated 45° relative to the rectangular contour of the board. As a result, the wall element can abut a wall of the vertical support element that is oblique in plan view in a particularly simple manner via the stop section and can be locked by means of the clip section to an end face of a shelf board or a horizontal cross strut of the shelf unit in such a way that the wall element can be reliably fixed both in and counter to the insertion direction. Support elements having a different cross section, for example a round or other polygonal cross section, or a different cross-sectional orientation are readily possible.

BRIEF DESCRIPTION OF THE DRAWINGS

The invention is explained in more detail below by way of example with reference to the drawings, in which.

DETAILED DESCRIPTION OF THE PREFERRED EMBODIMENTS

FIGS. 1 and 10 to 13 show an item of furniture 1 in the form of a shelf unit, which comprises a furniture structure 2 and at least one wall element 3 of the item of furniture 1, which can be secured to the furniture structure 2.

Figure 16:
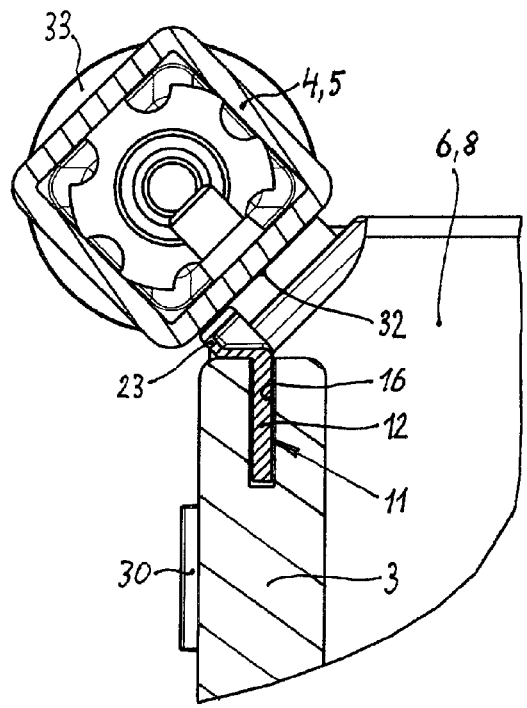
FIG. 16 is a horizontal section of a corner region of the item of furniture along the line XVI-XVI of FIG. 11, wherein a rear corner region is shown and a stop section can be seen.

In the embodiment shown, the furniture structure 2 comprises four first structural elements 4 in the form of vertical support elements 5, which are arranged in the four corner regions of the item of furniture 1. The vertical support elements 5 preferably consist of hollow, tubular profile elements which have a quadrilateral, in particular square, cross section, as can also be seen from FIG. 16. The four vertical support elements 5 are, as shown in FIG. 16 in reference to a single support element 5, arranged rotated 45° in relation to the rectangular outline of the item of furniture 1. The furniture structure 2 further comprises four second structural elements 6 in the form of horizontal boards, namely a bottom board 7, two middle, vertically spaced boards 8, 9 and a cover board 10.

Figure 1:
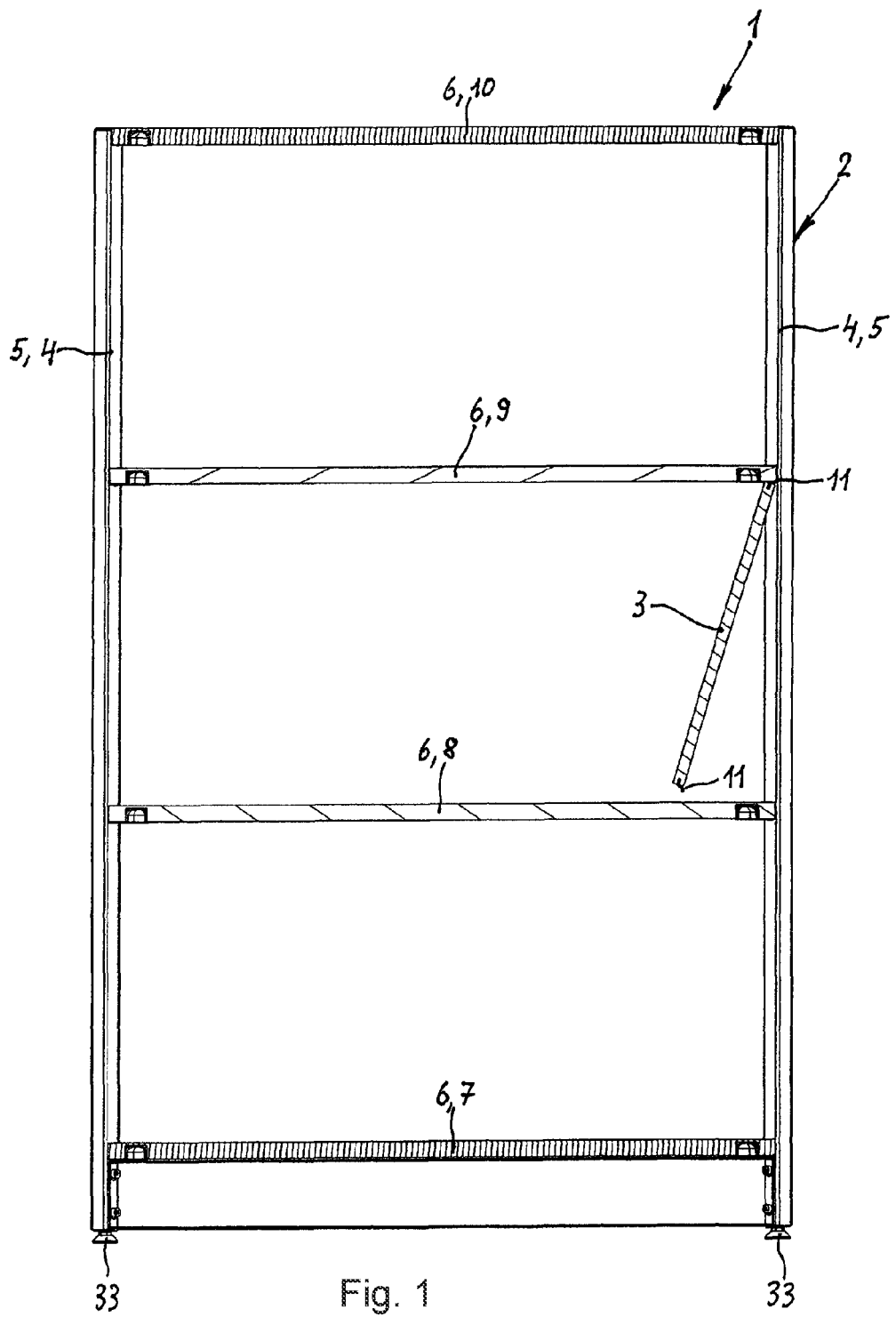
FIG. 1 is a vertical section through an item of furniture according to the invention in the form of a shelf unit, wherein a wall element is shown when inserted into the furniture structure.

As can be seen from FIG. 1, the wall element 3 can be, for example, a side element of the item of furniture 1 which is to be attached vertically to the furniture structure 2 and which is arranged in the region between a front and a rear vertical support element 5. The wall element 3 is secured by means of four retaining clips 11, which are secured to the wall element 3 in the four corner regions of the wall element 3 and interact both with a lateral surface 32 of two vertical support elements 5 (FIG. 16) and with an end region of the two middle boards 8, 9, as will be described in more detail below. As can be seen from FIGS. 1 and 9, the securing is carried out in such a way that the wall element 3 is attached to the vertical support elements 5 with a special stop section 23 of the retaining clips 11 and clipped into the furniture structure 2 with a clip section 27, the clip section 27 resting against the underside of the board 9 or the top of the board 8 and at the same time engaging behind the end faces of the boards 8, 9 in such a way that the wall element 3 is secured against falling out counter to the insertion direction.

As is shown, the wall element 3 is preferably clipped into the furniture structure 2 from the inside of the item of furniture 1. Securing the wall element 3 from the outside of the item of furniture 1 is, however, also possible in principle if the boards 8, 9 offer possibilities for the clip sections 27 to engage from behind that are positioned further to the inside.

Figure 2:
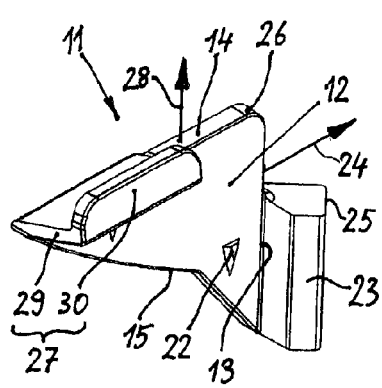
FIGS. 2-4 are different views of a first embodiment of the retaining clip according to the invention.
Figure 3:
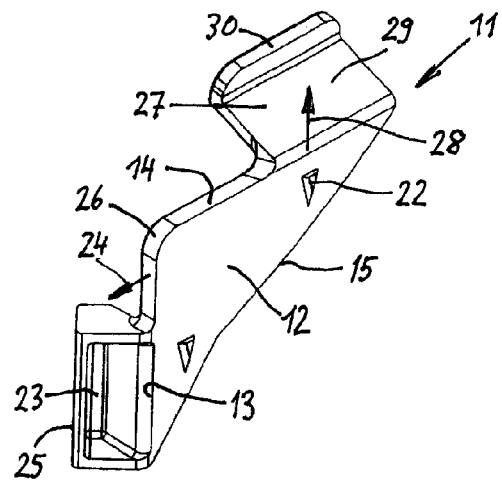
Figure 4:
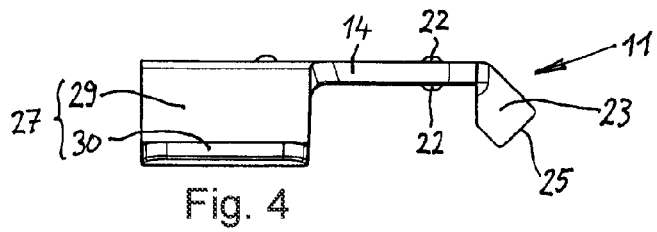
Figure 5:
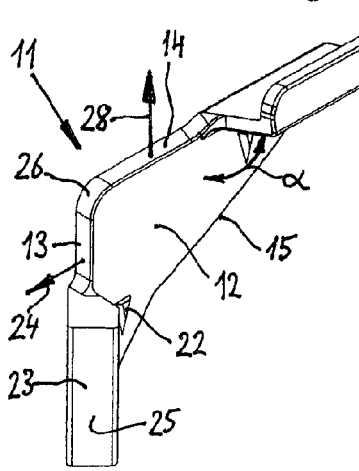
FIGS. 5-7 are different views of a second embodiment of the retaining clip according to the invention, which is a mirror image of the first embodiment.
Figure 6:
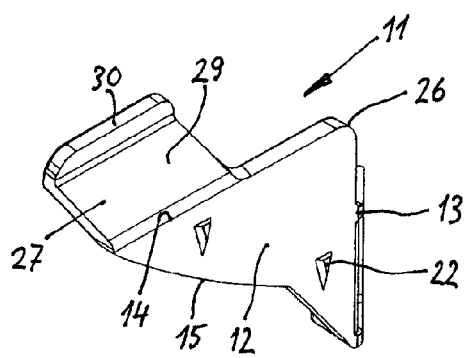
Figure 7:
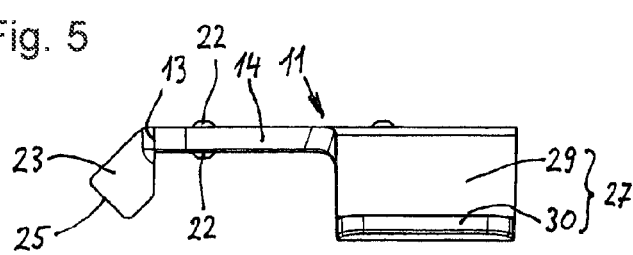

The retaining clip 11 is described in more detail below with reference to FIGS. 2 to 9. FIGS. 2 to 4 show a first embodiment of the retaining clip according to the invention, which is inserted in the upper right and lower left corner of the wall element 3 in the wall element 3 shown in FIG. 8. FIGS. 5 to 7 show a second embodiment of the retaining clip 11, which is basically the same as the first embodiment, but the mirror image thereof, and is inserted in the wall element 3 shown in FIG. 8 in the upper left corner and lower right corner.

The retaining clip 11 comprises a securing section 12 for securing the retaining clip 11 in a corner region of the wall element 3. The securing section 12 is planar and has approximately the shape of a right triangle in side view. A first cathetus of this triangle is formed by a first edge section 13 of the securing section 12, while a second cathetus is formed by a second edge section 14. The hypotenuse is formed by a third edge section 15, which consists of two curved sub-sections in the embodiment shown, but can also be shaped differently, and can in particular be straight. Alternatively, differently shaped securing sections 12, for example square or rounded securing sections, are also possible.

Figure 8:
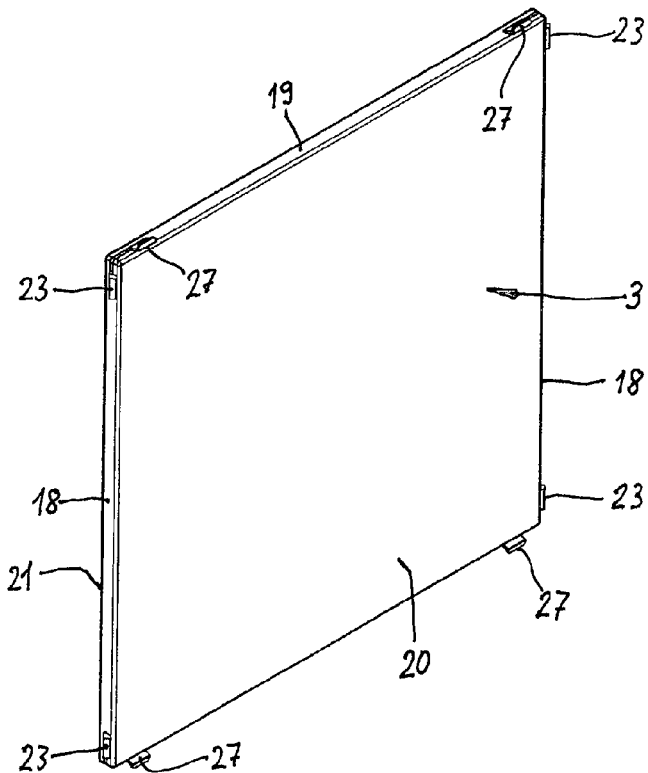
FIG. 8 is a three-dimensional representation of a wall element with retaining clips inserted.
Figure 9:
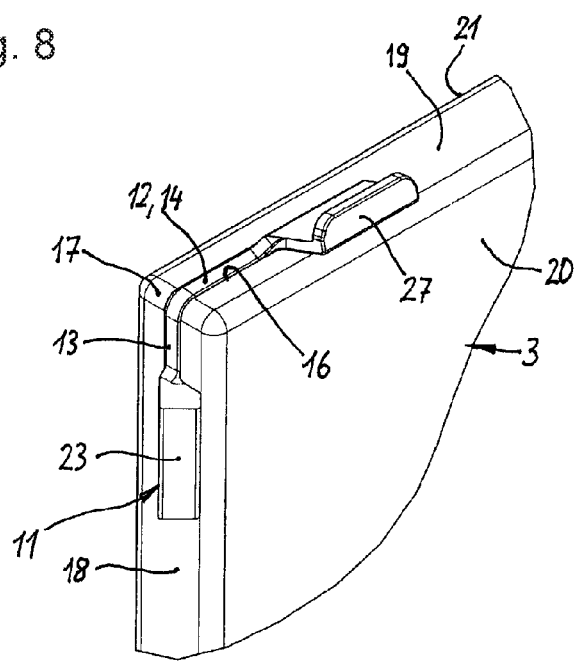
FIG. 9 is an enlarged view of the upper left corner of the wall element of FIG. 8.

As can be seen in particular from FIGS. 8 and 9, the securing section 12 is inserted into a securing slot 16 in the wall element 13. The securing slot 16 extends from a corner 17 of the wall element 3, which is formed by a first end face 18 and a second end face 19 of the wall element 3, centrally between the lateral surfaces 20, 21 of the wall element 3 into the wall element 3. The width of the securing slot 16 is adapted to the thickness of the securing section 12 in such a way that it can be inserted into the securing slot 16 without lateral play. The securing section 12 is completely accommodated in the securing slot 16, wherein the first edge section 13 of the securing section 12 preferably lies within the plane of the first end face 18 of the wall element 3, while the second edge section 14 of the securing section 12 preferably lies within the plane of the second end face 19 of the wall element 3. The two edge sections 13, 14 of the securing section 12 thus form a right angle to one another.

The securing section 12 also has anchoring knobs 22 on both lateral surfaces. These protrude beyond the lateral surfaces of the securing section 12 and are designed in such a way that they can press into the material of the wall element 3 when the securing section 12 is inserted into the securing slot 16, so that the retaining clip 11 is clamped in the securing slot 16. In this way, the retaining clips 11 can be locked on the wall element 3 without additional means. Alternatively or additionally, however, it is also possible to fix the retaining clips 11 in the wall element 3 by means of an additional adhesive or by welding the edge sections 13, 14 to the wall element 3.

The retaining clip 11 also has a stop section 23. This stop section 23 is integrally formed on the first edge section 13 of the securing section 12 and projects beyond the first edge section 13 in a first direction 24 which lies within the main plane of the securing section 12. The stop section 23 has a stop surface 25 which is arranged at an angle of 45° to the main plane of the securing section 12 and thus to the main plane of the wall element 3 and is used for abutting the vertical support element 5. The stop surface 25 faces outwards and has the shape of an elongated rectangle. Furthermore, the stop section 23 also projects over the securing section 12. As a result, the stop section 23 can also serve as an insertion stop up to which the securing section 12 can be inserted into the securing slot 16. In the inserted state, the stop section 23 is, as can be seen from FIG. 9, preferably in the gap between two planes in which the lateral surfaces 20, 21 of the wall element 3 lie. The stop section 23 thus does not protrude laterally over the wall element 3.

The stop section 23 is also at a distance from the corner 26 of the securing section 12 and thus also from the corner 17 of the wall element 3 in the assembled state. Forces acting on the stop section 23 are therefore introduced into the wall element 3 at a distance from the corner 17 of said wall element, which reliably prevents the risk of the wall element 3 breaking out in the corner region. In the embodiment shown, this distance is in the range between 5 and 15 mm, but this distance can vary widely.

The retaining clip 11 also includes a resilient clip section 27. This is integrally formed on the second edge section 14 of the securing section 12 and projects both in a second direction 28, which lies in the main plane of the securing section 12 and is perpendicular to the first direction 24, and across the securing section 12 in the direction of the outside of the item of furniture 1.

The clip section 27 is L-shaped in cross section. The clip section 27 comprises a connecting leg 29 and a retaining leg 30 which preferably extends perpendicularly away from said connecting leg and forms the free end of the clip section 27.

The clip section 27 is in turn arranged at a distance from the corner 26 of the securing section 12. This distance can vary widely and is 10 to 20 mm in the embodiment shown.

The angle α (FIG. 5) between the connecting leg 29 of the clip section 27 and the securing section 12 is more than 90° and in the embodiment shown is approximately 110°. As a result, at least when the wall element 3 is not yet installed, there is a free space between the connecting leg 29 and the end face 19 of the wall element 3, which space allows the clip section 27 to be pushed back far enough onto the end face 19 of the wall element 3 when the wall element 3 is inserted into the furniture structure 2 that the retaining leg 30 of the retaining clip 11 can be pushed over the edge region of the board 8 or 9 of the furniture structure 2 and then can spring back far enough into the original starting position that the retaining leg 30 overlaps the end face 31 of the board 8 or 9 (FIG. 7).

The retaining clip 11 expediently consists of a one-piece plastics part. The connecting leg 29 of the clip section 27 is planar and dimensioned in such a way that its free end and thus the retaining leg 30 can be moved essentially parallel to the main plane of the securing section 12, i.e., in the embodiment shown in the vertical direction in such a way that it approaches the end face 19 of the wall element 13.

Figure 13:
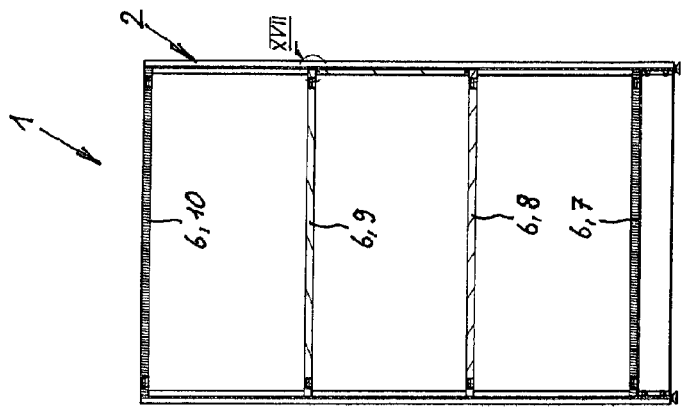
FIG. 13 is a vertical section of the item of furniture along the line XIII-XIII of FIG. 10.
Figure 12:
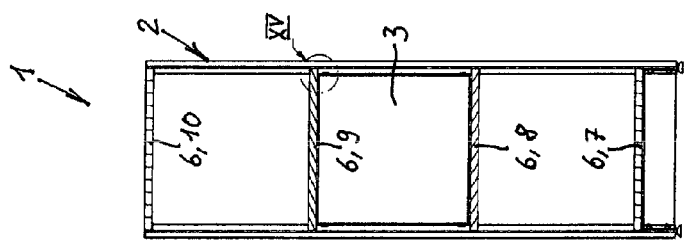
FIG. 12 is a vertical section through the item of furniture along the line XII-XII of FIG. 11.
Figure 11:
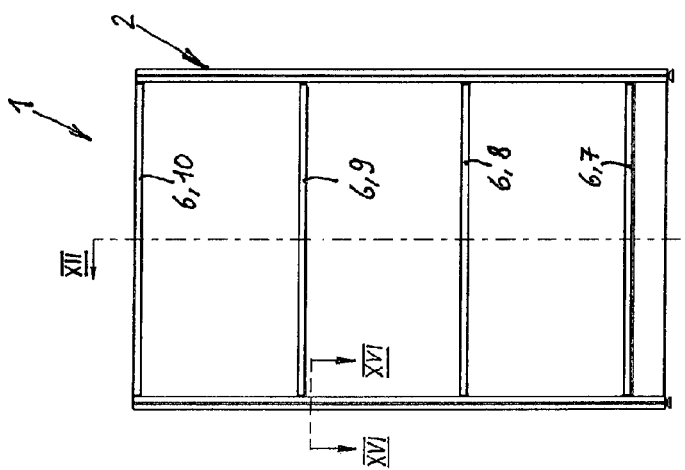
FIG. 11 is a front view of the item of furniture.
Figure 10:
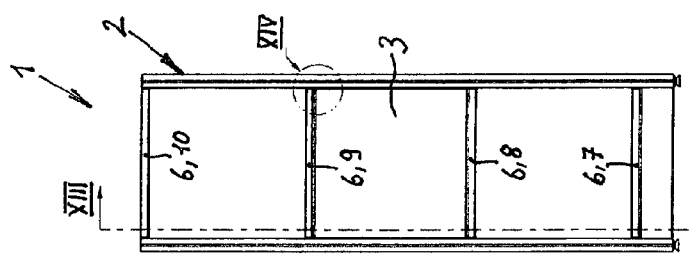
FIG. 10 is a side view of the item of furniture of FIG. 1, wherein a wall element is inserted in the middle.

FIG. 10 shows a side view of the item of furniture 1, FIG. 11 a front view, FIG. 12 a vertical section along the line XII-XII of FIG. 11 and FIG. 13 a vertical section along the line XIII-XIII of FIG. 10.

Figure 14:
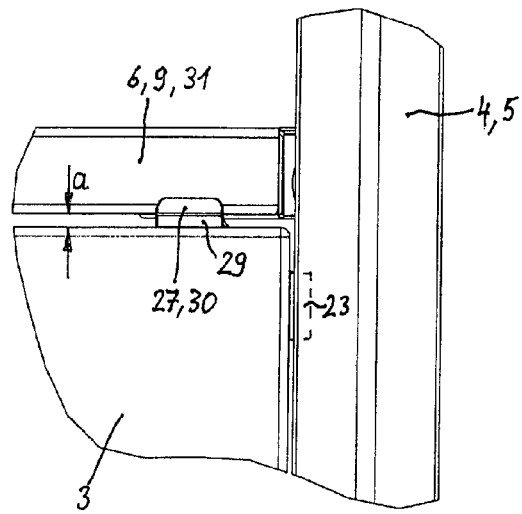
FIG. 14 is a detail XIV of FIG. 10 in an enlarged view seen from the outside of the item of furniture.

FIG. 14 shows the detail XIV of FIG. 10 on an enlarged scale. As can be seen from FIG. 14, when the wall element 3 is in the inserted state, the retaining leg 30 of the retaining clip 11 overlaps a preferably vertical end face 31 of the board 9. The board 9 thus forms the second structural element 6 within the meaning of the present invention.

Figure 15:
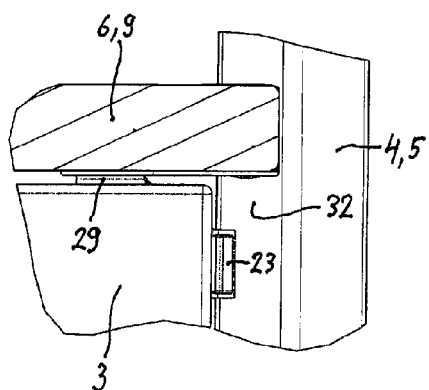
FIG. 15 is the detail XV from FIG. 12 in an enlarged view seen from the inside of the item of furniture.

FIG. 15 shows the detail XV from FIG. 12 on an enlarged scale and thus shows a corner region of the item of furniture 1 from the inside. As can be seen from FIGS. 15 and 16, the stop section 23 rests with its stop surface 25 against an inner diagonal lateral surface 32 of the vertical support element 32. The stop section 23 thus prevents the wall element 3 from being able to be pushed outwards beyond the vertical support element 5.

FIG. 16, which shows a horizontal section along the line XVI-XVI of FIG. 11 in the region of the rear vertical support element 5, also shows a retaining leg 30. However, this retaining leg 30 is not part of the retaining clip 11 shown in section in FIG. 16, which clip is arranged in the upper corner region of the wall element 3, but rather is part of a further retaining clip 11 that is arranged in the opposite lower corner region of the wall element 3.

FIG. 16 also shows a base 33 in plan view. This extends from below into the vertical support element 5 and is secured therein.

Figure 17:
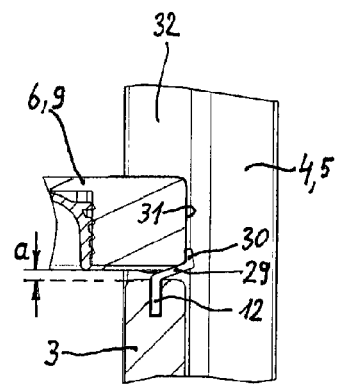
FIG. 17 is the detail XVII of FIG. 13 in an enlarged view, wherein a clip section can be seen.
Figure 18:
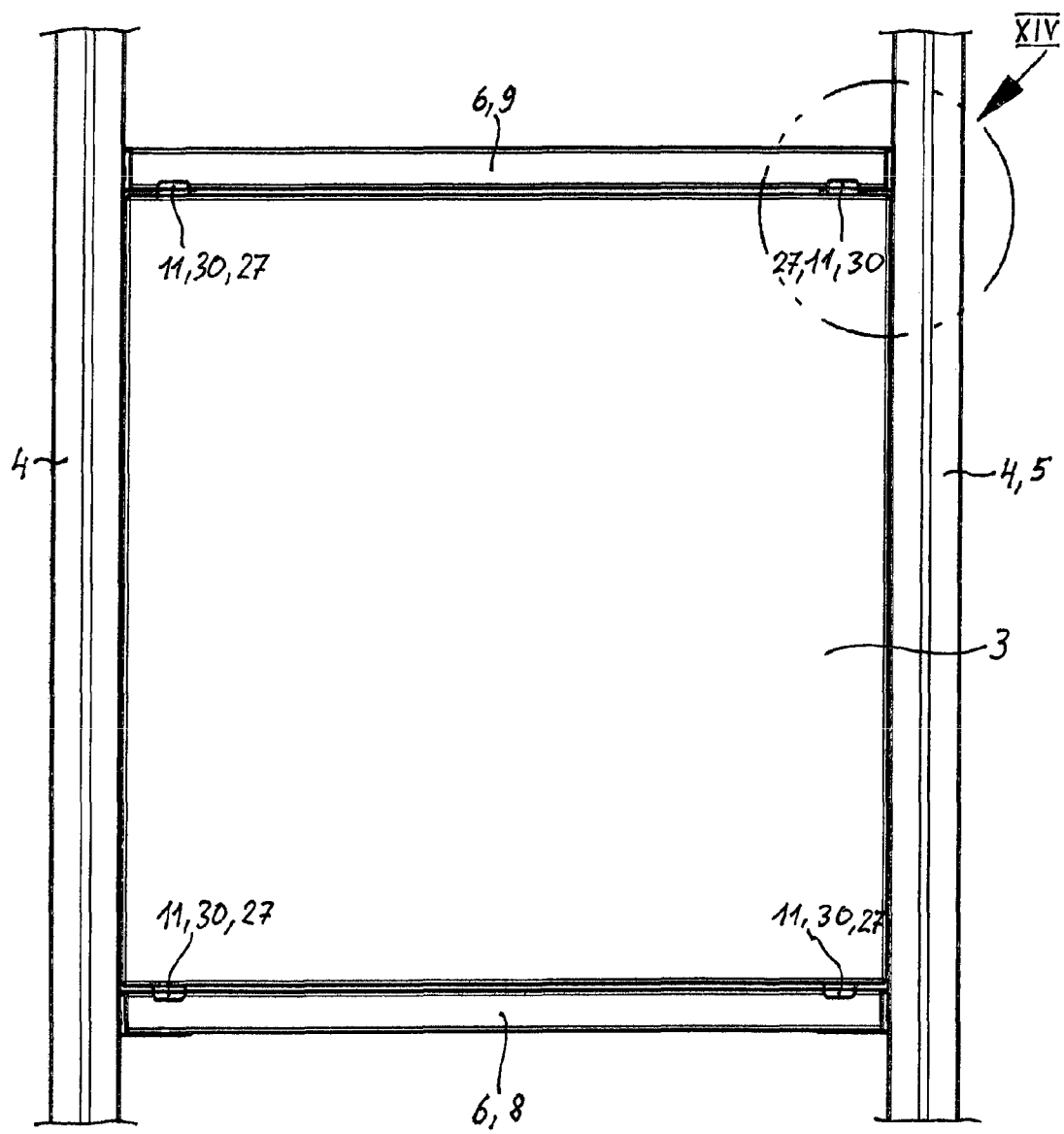
FIG. 18 is the central section of FIG. 10 in an enlarged view, wherein a complete wall element is visible from the outside.

FIG. 17 shows detail XVII from FIG. 13 in an enlarged view. It can be seen that the edge element 3 is held at a distance a from the upper board 9 as a result of the orientation of the connecting leg 29 of the clip section 27 increasing towards the outside of the item of furniture 1. This distance a is slightly larger than the thickness of the connecting leg 29. However, the distance a can advantageously be at most the same size or even slightly less than the height of the retaining leg 30 of the retaining clip 11, because, as can be seen from FIG. 18, oppositely situated retaining clips 11, the clip sections 27 of which extend downwards from the lower edge of the wall element 3 and overlap the end face of the board 8 situated therebelow, are secured to the wall element 3 not only in the region of its two upper corners, but also in the region of its two lower corners. Thus, there is also a distance a between the lower edge of the wall element 3 and the board 8 underneath. During assembly, the wall element 3 can thus, as shown in FIG. 1, first be brought to rest with its upper edge against the two vertical support elements 5 and from there can be brought into the locking end position engaging behind the end face 31 of the board 9 situated thereabove, whereupon the wall element 3 can then be pushed up slightly and also pivoted outwards into its locking end position in the lower region.

The oppositely situated clip sections 27 thus clamp the wall element 3 between two second structural elements 6 in the form of boards 8, 9 and hold it on these second structural elements 6 in such a way that it cannot be pushed inwards. This also results in a self-centring of the wall element 3 relative to the furniture structure 2 in the vertical direction, the upper and lower clip sections 27 exerting a prestressing force in opposite vertical directions. At the same time, the wall element 3 rests against oblique stop surfaces 25 of two vertical support elements 5 with stop sections 23 that protrude beyond both vertical edges of the wall element 3 in opposite directions, these stop surfaces being directed towards the inside of the item of furniture 1. The distance between the stop sections 23 of two opposing retaining clips 11 is thus greater than the minimum distance between the two vertical support elements 5, so that the wall element 3 can no longer be pushed outwards from the desired end position. The opposite stop sections 23 centre the wall element 3 in the horizontal direction in the furniture structure 2, i.e., between the vertical support elements 5.

The wall element 3 is thus securely fixed in all directions.

A large number of variants is possible within the scope of the invention. For example, it is possible that the second structural elements 6 are not boards 8, 9 but rather cross struts which connect two vertical support elements 5 to one another. The retaining legs 30 of the retaining clips 11 do not have to overlap end faces 19 of boards 8, 9 or cross struts, but can also engage in grooves which are arranged in the boards 8, 9 or cross struts. The vertical support elements 5 do not necessarily have to be oriented at an angle of 45° relative to the outline of the item of furniture 1, and can have a different orientation instead. For example, the securing system described can also be used with items of furniture 1 of which the support elements 5 are not arranged rotated relative to the outline of the furniture 1. Furthermore, it is possible to exchange the position of the stop section 23 and clip section 27, wherein the clip sections 27 overlap the vertical support elements 5 while the stop sections 23 abut suitable surfaces or consoles of the second structural elements 6.

The invention claimed is:

1. A retaining clip for securing a wall element of an item of furniture to a furniture structure, comprising:
 a securing section configured to secure the retaining clip to the wall element, the securing section having a first edge section and a second edge section;
 a stop section which extends away from the first edge section of the securing section in a first direction and is configured to abut a first structural element of the furniture structure;
 a resilient clip section which extends away from the second edge section of the securing section in a second direction different from the first direction and is resiliently movable between an insertion position permitting insertion of the wall element into the furniture structure and a retaining position engaging a second structural element of the furniture structure behind the second structural element;

wherein the stop section and the clip section form insertion stops for limiting an insertion path of the securing section into the wall element; and wherein the securing section has anchoring knobs projecting on at least one lateral surface of the securing section, wherein the anchoring knobs are configured to anchor the retaining clip in the wall element.

2. The retaining clip according to claim 1, wherein the securing section has a planar portion and the first and second edge sections extend at an angle of 90° to one another, the stop section and the clip section projecting beyond the first and second edge sections in directions orthogonal to each other.

3. The retaining clip according to claim 2, wherein the securing section has a main plane and the stop section has a stop surface which is configured to abut the first structural element of the furniture structure, and wherein the stop surface is arranged at an angle of 45° to the main plane of the securing section.

4. The retaining clip according to claim 3, wherein the stop section and the clip section are spaced 2 to 50 mm from a corner of the securing section formed by the first and second edge sections.

5. The retaining clip according to claim 4, wherein the clip section is L-shaped in cross section and has a connecting leg that is integrally formed on the securing section and extends transversely therefrom, and a retaining leg which is integrally formed on the connecting leg and is configured to rest against the second structural element of the furniture structure.

6. The retaining clip according to claim 5, wherein the connecting leg extends at an angle of greater than 90° and up to 160° relative to the securing section.

7. The retaining clip according to claim 1, wherein the securing section has a main plane and the stop section has a stop surface which is configured to abut the first structural element of the furniture structure, and wherein the stop surface is arranged at an angle of 45° to the main plane of the securing section.

8. The retaining clip according to claim 1, wherein the stop section and the clip section are spaced 2 to 50 mm from a corner of the securing section formed by the first and second edge sections.

9. The retaining clip according to claim 1, wherein the clip section is L-shaped in cross section and has a connecting leg that is integrally formed on the securing section and extends transversely therefrom, and a retaining leg which is integrally formed on the connecting leg and is configured to rest against the second structural element of the furniture structure.

10. The retaining clip according to claim 9, wherein the connecting leg extends at an angle of greater than 90° and up to 160° relative to the securing section.

11. An item of furniture, comprising:
a wall element and a retaining clip for securing the wall element to a furniture structure;
wherein the retaining clip comprises:
a securing section configured to secure the retaining clip to the wall element, the securing section having a first edge section and a second edge section;
a stop section which extends away from the first edge section of the securing section in a first direction and is configured to abut a first structural element of the furniture structure; and
a resilient clip section which extends away from the second edge section of the securing section in a second direction different from the first direction and is resiliently movable between an insertion position permitting insertion of the wall element into the furniture structure and a retaining position engaging a second structural element of the furniture structure behind the second structural element; and
wherein the wall element is planar and comprises:
lateral surfaces;
first and second end faces forming a corner; and
a securing slot for inserting the securing section of the retaining clip, the securing slot extending from the corner of the wall element between the lateral surfaces into the wall element.

12. The item of furniture according to claim 11, wherein the first and second edge sections of the securing section of the retaining clip inserted into the securing slot extend parallel to the first and second end faces of the wall element, respectively.

13. The item of furniture according to claim 11, wherein the stop section of the inserted retaining clip is situated in a gap between two planes in which the lateral surfaces of the wall element lie.

14. The item of furniture according to claim 11, wherein the first structural element with which the stop section of the retaining clip interacts is a vertical support element of the item of furniture, while the second structural element with which the clip section of the retaining clip interacts is a board of the item of furniture or a horizontal strut of the item of furniture.

15. The item of furniture according to claim 11, wherein the first structural element is a vertical support element of a shelf unit and the second structural element is a shelf board of the shelf unit or a horizontal cross strut of the shelf unit.

16. The item of furniture according to claim 11, wherein the item of furniture has at least two vertical support elements having a rectangular cross section and at least one board having a rectangular contour, wherein the at least one board is supported by the at least two vertical support elements, the rectangular cross section of the at least two vertical support elements being arranged rotated 45° relative to the rectangular contour of the at least one board.

17. A retaining clip for securing a wall element of an item of furniture to a furniture structure, comprising:
a securing section configured to secure the retaining clip to the wall element, the securing section having a first edge section and a second edge section;
a stop section which extends away from the first edge section of the securing section in a first direction and is configured to abut a first structural element of the furniture structure; and
a resilient clip section which extends away from the second edge section of the securing section in a second direction different from the first direction and is resiliently movable between an insertion position permitting an insertion of the wall element into the furniture structure and a retaining position engaging a second structural element of the furniture structure behind the second structural element;
wherein the securing section has a planar portion and the first and second edge sections extend at an angle of 90° to one another, the stop section and the clip section projecting beyond the first and second edge sections in directions orthogonal to each other;
wherein the securing section has anchoring knobs projecting on at least one lateral surface of the securing section, wherein the anchoring knobs are configured to anchor the retaining clip in the wall element;

wherein the securing section has a main plane and the stop section has a stop surface which is configured to abut the first structural element of the furniture structure, and wherein the stop surface is arranged at an angle of 45° to the main plane of the securing section; and wherein the stop section and the clip section are spaced 2 to 50 mm from a corner of the securing section formed by the first and second edge sections.

\* \* \* \* \*